Patented May 31, 1938

2,118,834

UNITED STATES PATENT OFFICE 2,118,834

METHOD FOR DISTILLING LIQUORS

Benjamin C. Boeckeler, New York, N. Y., assignor to The Lummus Company, New York, N. Y., a corporation of Delaware Application June 22, 1934, Serial No. 731,857

2 Claims. (Cl. 202—39)

The present invention relates to methods for distilling liquors.

The object of the invention is to provide a continuous method for concentrating and purifying liquors with a particular view to convenient elimination of aldehydes and other undesirable head products from the distillate, while still retaining the desirable flavor-producing materials. To this end, the invention comprises a method hereinafter described and particularly defined in the claims.

Figure 1:
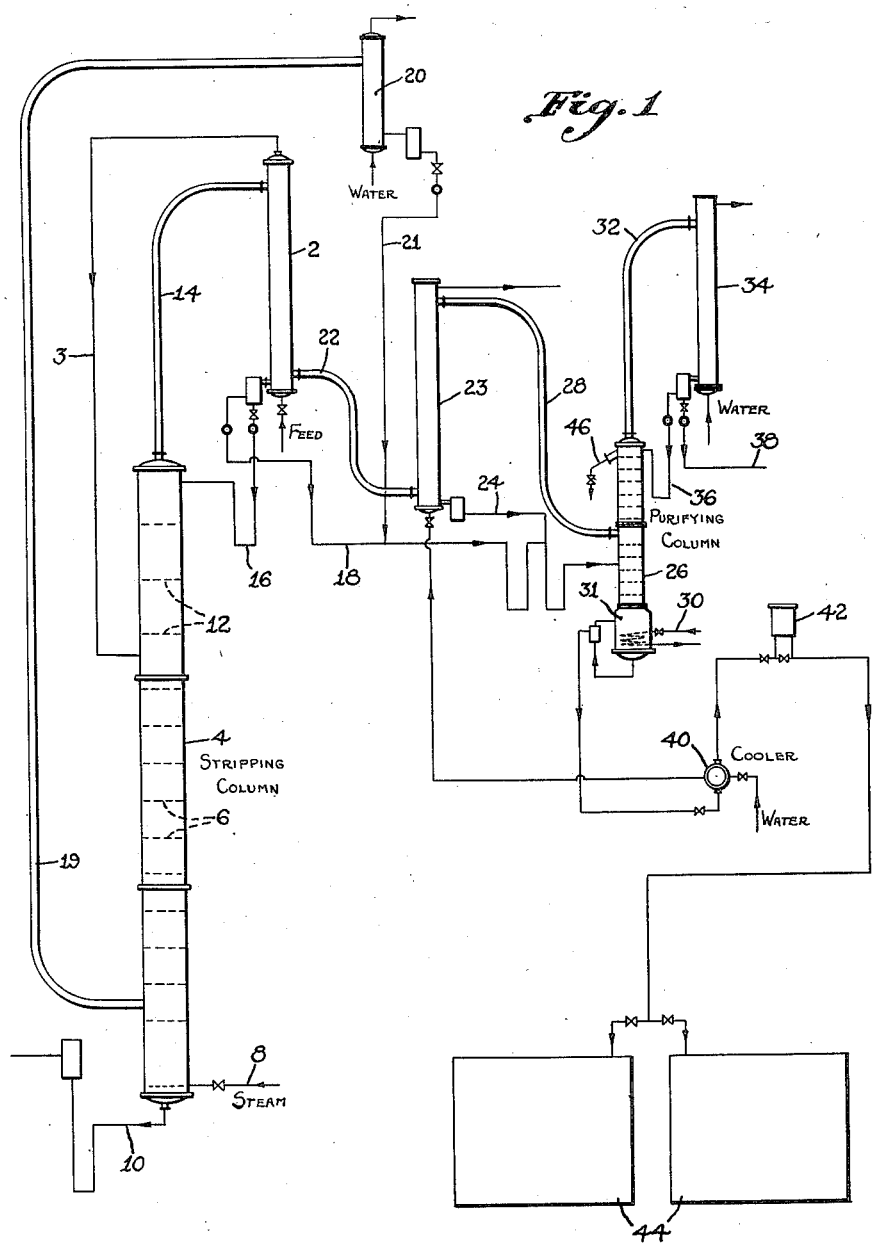
Figure 2:
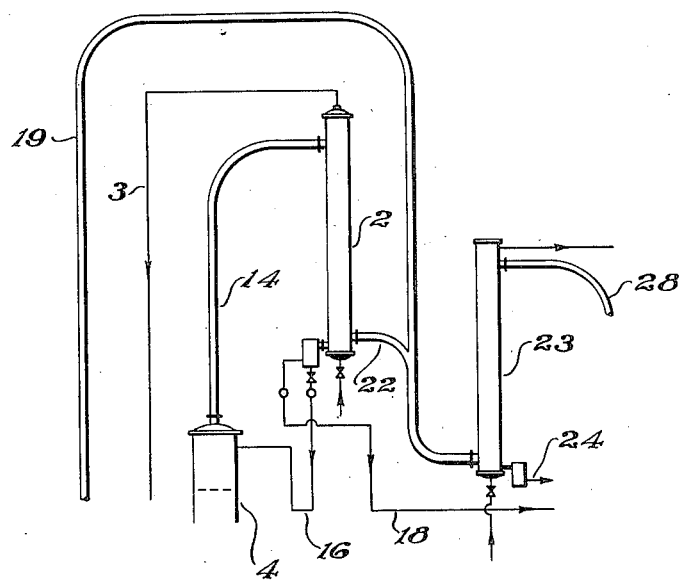

In the accompanying drawings Fig. 1 is a flow diagram illustrating the preferred form of the invention, and Fig. 2 is a diagram illustrating a modified form of the invention.

The fermented mash, containing usually between 5 and 10% of alcohol, is fed through a heat exchanger illustrated as a reflux condenser 2 from which it passes by a feed pipe 3 to an intermediate part of the stripping column 4. The stripping column is provided below the point of feed with a number of contact decks 6 over which the liquid passes. Open steam is introduced into the bottom of the column at 8 and the tail product, comprising principally water, is withdrawn at 10. Above the point of feed, the column is provided with rectifying decks 12. The vapors from the top of the column, containing usually about 50% of alcohol, pass through a vapor pipe 14 to the reflux condenser 2 wherein they are partially condensed. The condensate is withdrawn from the condenser and a portion is returned to the column by a reflux pipe 16, the remaining passing through a trapped pipe 18 to the purifying column, as will hereinafter be described.

Part of the higher boiling vapors are withdrawn from a point near the bottom of the stripping column and carried by a vapor pipe 19 to a condenser 20. A condensate pipe 21 leads from the condenser to the pipe 18.

The vapors uncondensed in the reflux condenser are passed by a vapor pipe 22 to the bottom of a partial condenser 23. The condensate from the bottom of the partial condenser is passed through a pipe 24 which joins the pipe 18 and leads to the purifying column 26. It will be observed that the vapor pipe 22 enters the partial condenser at the bottom, contrary to the usual practice, in order that the condensate forming in the upper part of the condenser may act as reflux to effect a partial purification of the vapors.

The vapors from the partial condenser pass by a vapor pipe 28 into the purifying column at a point above the liquid feed. The purifying column is provided with contact decks, as shown in the diagram. The column is heated by means of closed steam coils 30 in the bottom section 31 of the column. The vapors from the top of the column pass through the vapor pipe 32 to a heads condenser 34. A part of the condensate is returned by a reflux pipe 36 to the top of the column and the remainder is withdrawn at 38. The purified liquor, usually of about 50% alcohol concentration, is withdrawn from the bottom of the column and passes through a cooler 40 and a product gage 42 to storage tanks 44.

The condensate from the condensers 2, 20 and 23, which is passed by the pipes 18 and 24 to the purifying column, may contain a small amount of aldehyde impurities but the greater portion thereof appears in the vapors passing into the purifying column through the pipe 28. These vapors also contain a considerable quantity of uncondensed alcohol. The vapors are purified by rectification in the upper part of the purifying column 26, the alcohol being condensed by the reflux and flowing downwardly through the column to the bottom. Any heads impurities in the liquid feed to the purifying column are vaporized by the hot vapors vaporized in the bottom of the column. By proper control of reflux and heating, a substantially complete elimination of aldehydes from the product and a substantially complete recovery of the alcohol and desirable flavoring materials may be effected.

For maximum separation of the heads products, total reflux may be practised. To this end, the pipe 38 is closed and the total condensate from the heads condenser is returned to the column. The aldehydes concentrate in the upper decks and may be periodically withdrawn through a draw-off 46.

In addition to the removal of undesirable heads products, the present invention provides for retention of materials that produce desirable flavor and aroma in the liquor. It has been observed that liquors obtained by continuous methods are usually inferior to those obtained by pot still distillation. The pot still method allows some of the fusel oils and organic acids to come over with the liquor distillate, and it is these materials which, either in the original form or as altered by subsequent esterification, provide the desirable flavor. In continuous methods as ordinarily practised, however, the separation of such materials is too complete.

According to the present invention, a portion of the heavier vapors, including fusel oils and organic acids, is taken off the stripping column and condensed at 20 to be mixed with the feed running to the purifying column. A product comparable to that obtainable by pot still distillation may thus be made, while taking advantage of the economy and uniformity of continuous operation.

A simplification of the apparatus is illustrated in Fig. 2, the vapor draw-off pipe 19 connecting directly with the vapor pipe 22 leading to the partial condenser 23. The vapors coming over from the stripping column are therefore condensed in the condenser 23, along with the vapors coming from the condenser 2. The condensate passing by pipe 24 to the purifying column therefore contains the desired flavor-producing higher boiling materials. By this arrangement, the condenser 20, the condensate pipe 21 and associated apparatus may be omitted.

The invention also permits partial ageing of the liquor in a relatively short time. Ageing is largely a matter of esterification of the higher alcohols (fusel oils) and organic acids. This action proceeds very slowly at normal temperatures but is rapidly accelerated at elevated temperatures. Advantage is taken of the relatively high temperature in the bottom section 31 of the purifying column. The section is purposely made fairly large to hold the liquor several hours at a temperature of about 200° F., which, at the accelerated rate of reaction, gives an ageing effect comparable to that obtainable by maturing in casks for several weeks.

Having thus described the invention, what is claimed is:

1. A method of making an alcoholic beverage high in alcoholic content from a fermented material low in alcoholic content, which comprises the steps of continuously feeding said fermented material to a stripping column, rectifying the alcoholic vapors, withdrawing the high boiling flavoring constituents from a low point in the stripping column substantially below the point of feed, removing a part of the rectified vapors and subjecting them to a second rectification to form a vapor high in aldehyde content and a condensate low in aldehyde content, condensing the high boiling flavoring constituents and mixing the said high boiling flavoring constituent condensate with the condensate of the first and second rectification steps, introducing said last mentioned condensate and the high aldehyde content vapors to said purifying column, rectifying said vapors and condensate and removing the aldehydes as a heads product and the desired beverage as condensate.

2. A method of distilling fermented material low in alcoholic content and containing flavoring constituents to produce an alcoholic beverage high in alcoholic content which consists in distilling the fermented material in a rectifying column having an upper rectifying zone, a lower stripping zone and an intermediate feeding zone, rectifying the alcoholic vapors in the rectifying zone, withdrawing the high boiling flavoring constituents from the stripping zone, condensing the high boiling flavoring constituents, mixing said condensate with the condensate of the alcoholic vapors, the vapors of which have been subjected to further rectification to partially remove the aldehydes, subjecting the mixture of condensates to further rectification, recovering the alcoholic beverage of high alcoholic content containing the original flavoring constituents as a condensate.

BENJAMIN C. BOECKELER.